(12) United States Patent
Zimmer et al.

(10) Patent No.: US 7,493,460 B2
(45) Date of Patent: Feb. 17, 2009

(54) PREBOOT MEMORY OF A COMPUTER SYSTEM

(75) Inventors: Vincent J. Zimmer, Federal Way, WA (US); Andrew J. Fish, Olympia, WA (US); Michael A. Rothman, Puyallup, WA (US); Mahesh Natu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 11/220,422

(22) Filed: Sep. 7, 2005

(65) Prior Publication Data

US 2007/0055856 A1    Mar. 8, 2007

(51) Int. Cl.
G06F 13/00    (2006.01)
G06F 9/00    (2006.01)
(52) U.S. Cl. .............................. 711/166; 711/170; 713/2
(58) Field of Classification Search ........................ None
See application file for complete search history.

(56) References Cited

U.S. PATENT DOCUMENTS

| | | | |
|---|---|---|---|
| 5,809,531 A | | 9/1998 | Brabandt |
| 6,374,338 B1 | | 4/2002 | Garvey |
| 7,149,890 B2 | * | 12/2006 | Justen .............................. 713/2 |
| 2004/0158828 A1 | | 8/2004 | Zimmer et al. |
| 2005/0071617 A1 | * | 3/2005 | Zimmer et al. .................. 713/1 |
| 2005/0114620 A1 | | 5/2005 | Justen |

FOREIGN PATENT DOCUMENTS

WO    PCT/US2006/030181    12/2006

OTHER PUBLICATIONS

Intel Corporation, "Intel® Platform Innovation Framework for EFI Architecture Specification," Version 0.9, Sep. 16, 2003, pp. i-x, 11-32.
Intel Corporation, "IA-32 Intel® Architecture Software Developer's Manual Volume 3: System Programming Guide, Chapter 10: Memory Cache Control," 2003, pp. i-xxxv, 10-1-10-44.
PCT/US2006/030181—PCT International Preliminary Report on Patentability, dated Mar. 11, 2008.

* cited by examiner

Primary Examiner—Denise Tran
(74) Attorney, Agent, or Firm—Blakely, Sokoloff, Taylor & Zafman LLP

(57) ABSTRACT

A temporary memory of a computer system is configured during a boot mode. Page tables are generated for the temporary memory. System memory of the computer system is initialized. Contents of the temporary memory are migrated to the system memory.

18 Claims, 7 Drawing Sheets

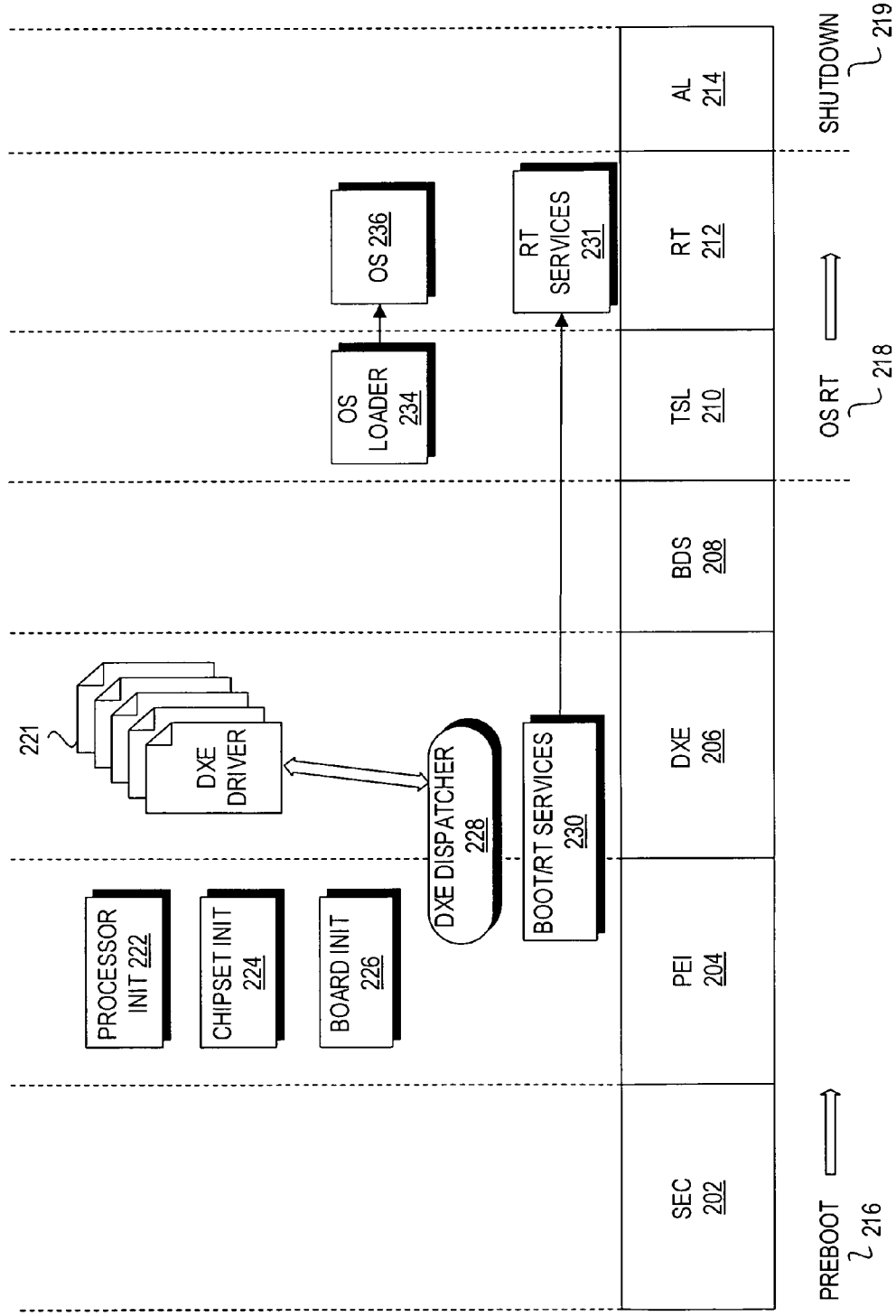

CONFIGURE PAGE TABLES IN TEMPORARY MEMORY
600

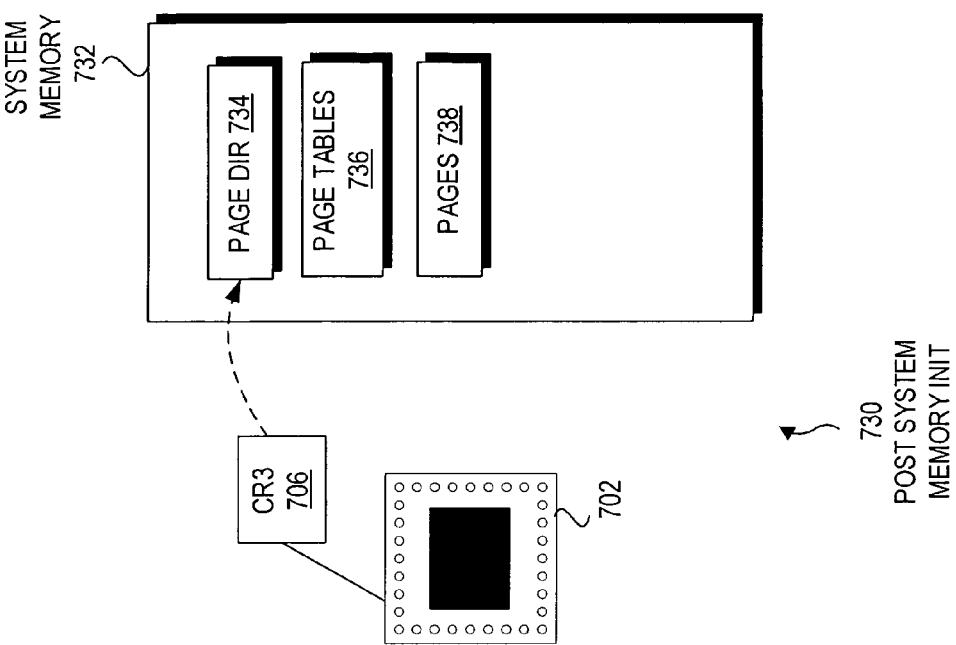
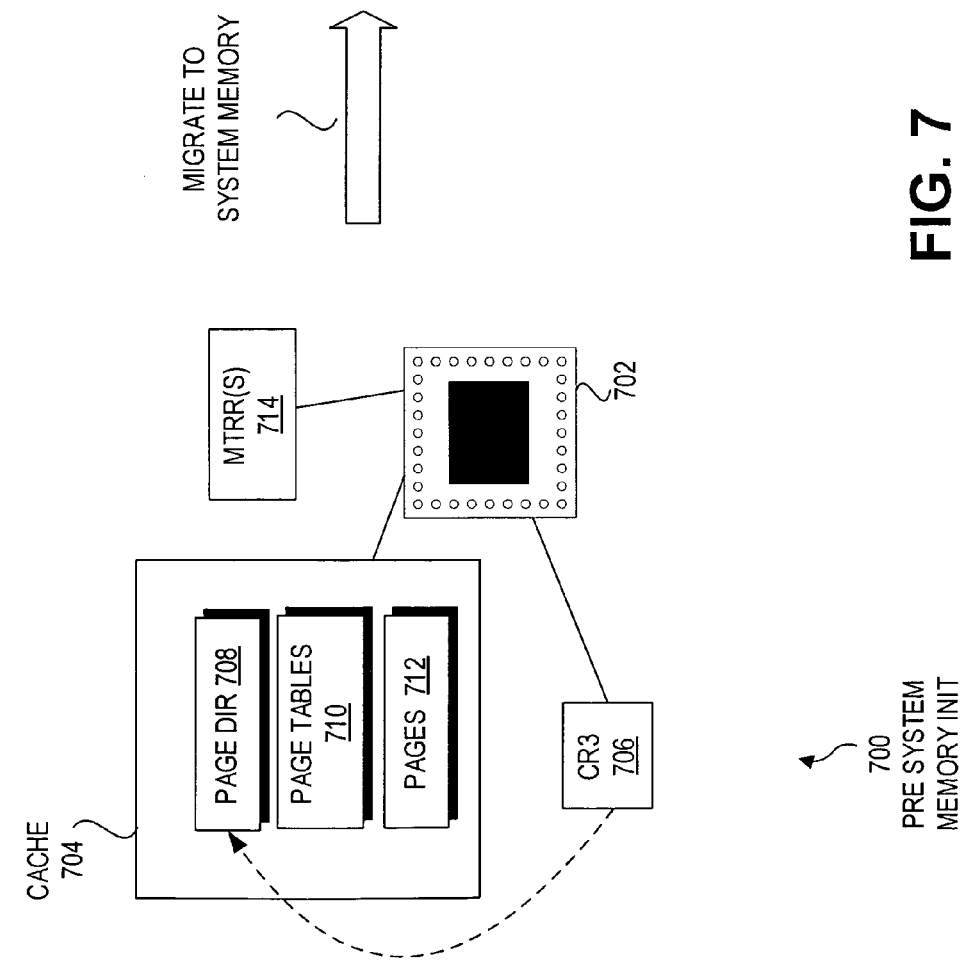
FIG. 7

PREBOOT MEMORY OF A COMPUTER SYSTEM

BACKGROUND

1. Field

Embodiments of the invention relate to the field of computer systems and more specifically, but not exclusively, to preboot memory of a computer system.

2. Background Information

In typical computer architecture, the initialization and configuration of the computer system by firmware, such as the system Basic Input/Output System (BIOS), is commonly referred to as the preboot phase. The preboot phase is generally defined as the time between a processor reset and loading of an Operating System (OS). At the start of preboot, it is up to the code in the firmware to initialize the platform to the point that an operating system loaded off of media, such as a hard disk, can take over.

The start of the OS load begins the period commonly referred to as OS runtime. During OS runtime, the firmware may act as an interface between software and hardware components of a computer system as well as handle system-related tasks. As computer systems have become more sophisticated, the operational environment between the OS level and the hardware level is generally referred to as the firmware or the firmware environment.

Today's systems are moving toward a 64-bit computing environment. 64-bit computing enables memory addressing above 4-Gigabytes (GBs) of virtual memory. Memory paging is used to map virtual memory to physical memory of a system. In a 64-bit system, preboot may also include 64-bit processes. For example, during preboot, control and status registers may be mapped above the 4-GB line. However, current designs fail to efficiently support 64-bit memory addressing during the preboot phase.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a block diagram illustrating the phases of an Extensible Firmware Interface (EFI) implementation in accordance with one embodiment of the present invention.

FIG. 7 is a block diagram illustrating preboot memory in accordance with one embodiment of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Figure 1:
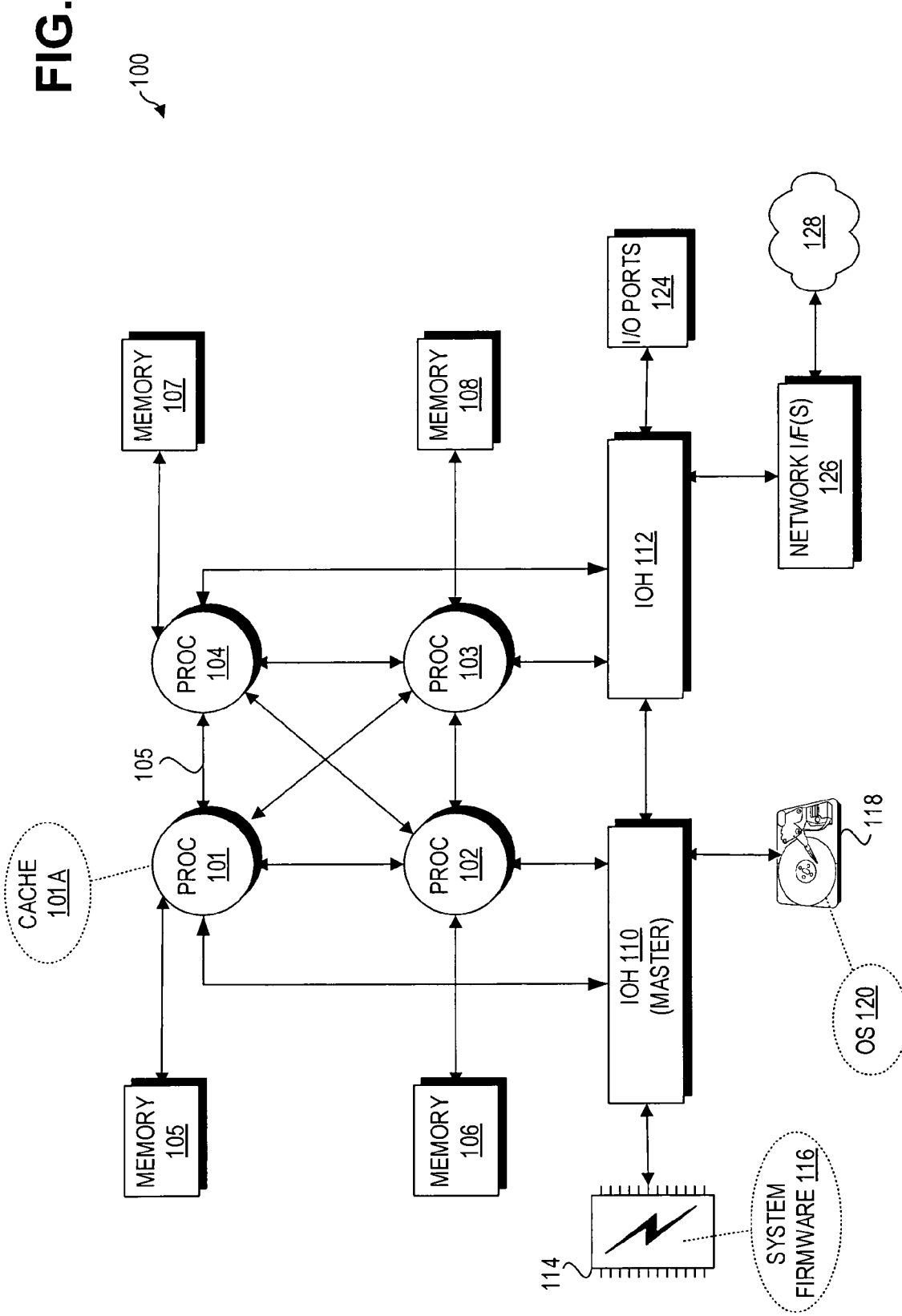
FIG. 1 is a block diagram illustrating a computer system in accordance with one embodiment of the present invention.

Referring to FIG. 1, an architecture of a computer system 100 in accordance with embodiments of the invention is shown. It will be appreciated that embodiments of the invention are not limited to the architecture as shown in FIG. 1. Further details regarding computer system 100 are discussed at the end of this specification.

In one embodiment, computer system 100 is a multiprocessor system that includes processors 101, 102, 103 and 104. Each processor may include a cache, such as cache 101A of processor 101. Cache 101A may include an L1 cache, an L2 cache, or an L3 cache.

While FIG. 1 shows four processors, it will be understood that embodiments of computer system 100 may include less than or more than four processors. In other embodiments, a processor may support Intel® Hyper-Threading Technology. In an alternative embodiment using a multi-core processor, each processor 101-104 of FIG. 1 may represent a core.

In one embodiment, processors 101-104 are coupled by links. For example, processor 101 is coupled to processor 104 by link 105. The links provide a point-to-point interconnection between two endpoints, also referred to as nodes. In one embodiment, a link includes two unidirectional physical connections that transmit information serially. In another embodiment, commands and/or data are transported across a link in the form of packets. Embodiments of a link include, but are not limited to, a Common System Interface (CSI) as promulgated by the Intel® Corporation, or the like.

In one embodiment, each processor 101-104 is coupled to a corresponding memory 105-108, respectively. In one embodiment, each memory 105-108 is coupled to processor 101-104, respectively, by a link. In one embodiment, each processor 101-104 includes a memory controller.

In one embodiment, each processor 101-104 has access to the memory 105-108 of all the other processors. In this particular embodiment, memory is presented as a single virtual block. However, this single virtual block may map to various physical memory 105-108. In one embodiment, memory 105-108 makes up the system memory of computer system 100.

Processors 101 and 102 are coupled to an Input/Output Hub (IOH) 110 and processors 103 and 104 are each coupled to an IOH 112. In the embodiment of FIG. 1, IOH 110 serves as the master IOH.

Embodiments of a processor include a 32-bit processor having a 64-bit memory addressing mode. Embodiments of such a processor include, but are not limited to, an Intel® Architecture (IA)-32 processor that incorporates the Intel® Extended Memory 64 Technology (EM64T), or the like. The 64-bit memory addressing mode expands the memory addressing capabilities of an IA-32 architecture beyond 4 GBs while enabling an IA-32 system to continue to run 32-bit x86-based applications. Intel® Pentium 4 and Xeon processors may include EM64T.

Various devices may be coupled to IOH 110 and 112. In computer system 100, a Non-Volatile Storage (NVS) 114, such as Flash memory, may be coupled to IOH 110. NVS 114 may have stored system firmware 116.

Embodiments of the system firmware 116 described herein may be implemented substantially in compliance with the Extensible Firmware Interface (EFI) (*Extensible Firmware Interface Specification,* Version 1.10, Dec. 1, 2002). EFI enables firmware, in the form of firmware modules, such as drivers, to be loaded from a variety of different resources, including flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review,* Version 0.9, Sep. 16, 2003 (hereafter referred to as the "Framework"). It will be understood that embodiments of the present invention are not limited to the Framework or implementations in compliance with the EFI specification.

A storage device 118, such as a hard disk drive, may be coupled to IOH 110 and has stored instructions for an operating system 120. Embodiments of OS 120 include Microsoft®) Windows, Unix, Linux, Apple® Mac OS, and the like.

IOH 112 is coupled to Input/Output (I/O) ports 124 and one or more network interfaces 126. I/O ports 124 may be used to connect I/O devices, such as a keyboard, mouse, monitor, printer, or the like. Network interfaces (I/F(s)) 126 may send and receive communications over network 128.

Embodiments of the present invention provide memory paging in a temporary memory prior to system memory initialization. Embodiments of the invention also provide for 64-bit addressing during the preboot phase of computer system 100. System firmware 116 executing before system memory 105-108 is initialized may use a temporary memory that is capable of 64-bit addressing. Embodiments of this temporary memory include cache 101A and non-volatile storage 114. After memory 105-108 is initialized, the contents of the temporary memory are migrated to the system memory.

FIG. 2 is a block diagram illustrating the phases of the Framework in accordance with an embodiment of the present invention. The phases include a Security (SEC) phase 202, a Pre-EFI Initialization (PEI) phase 204, a Driver Execution Environment (DXE) phase 206, a Boot Device Selection (BDS) phase 208, a Transient System Load (TSL) phase 210, an Operating System Run-Time (RT) phase 212, and an After-Life (AL) phase 214. The phases build upon one another to provide an appropriate run-time environment for the OS and platform. The bottom of FIG. 2 shows preboot 216, OS runtime 218, and shutdown 219.

The SEC phase 202 supports security checks of the initial op-code to be executed on the computer system. The SEC phase 202 includes the power-on sequence of the computer system and authenticates the PEI Foundation (discussed below) before the PEI Foundation is allowed to execute.

PEI phase 204 provides a standardized method of loading and invoking specific initial (INIT) configuration routines for the processor 222, chipset 224, and motherboard 226. The PEI phase is responsible for initializing enough of the system to provide a stable base for the follow on phases. Initialization of the platform's core components, including the processor, chipset and motherboard is performed during the PEI phase. The PEI phase discovers memory and prepares a resource map that is handed off to the DXE phase. The state of the system at the end of the PEI phase is passed to the DXE phase through a list of data structures called Hand Off Blocks (HOBs). PEI phase 204 will be discussed in further detail below.

DXE phase 216 is the phase during which most of the system initialization is performed. DXE phase 116 is facilitated by several components, including the DXE Core, the DXE Dispatcher 228, and a set of DXE drivers 221. The DXE Core produces a set of Boot/Runtime Services 230, and DXE Services. DXE Dispatcher 228 is responsible for discovering and executing DXE drivers 221 in the correct order. DXE drivers 221 are responsible for initializing the processor, chipset, and platform components as well as providing software abstractions for console and boot devices. These components work together to initialize the platform and provide the services required to boot an operating system.

The BDS phase 208 further prepares the computer system to load an operating system.

The TSL phase 210 allows services to be available to an OS loader 234 before the OS is allowed to take control of the computer system. Once the OS is successfully loaded, the OS may make an ExitBootServices call that ends the Boot Services and frees Boot Services resources for use by the OS.

At the RT phase 212, the firmware turns over control of some hardware to the operating system 236. EFI Runtime services 231 survive into the RT phase 212.

In the AL phase 114, the firmware may continue to function after the OS has terminated.

Figure 3B:
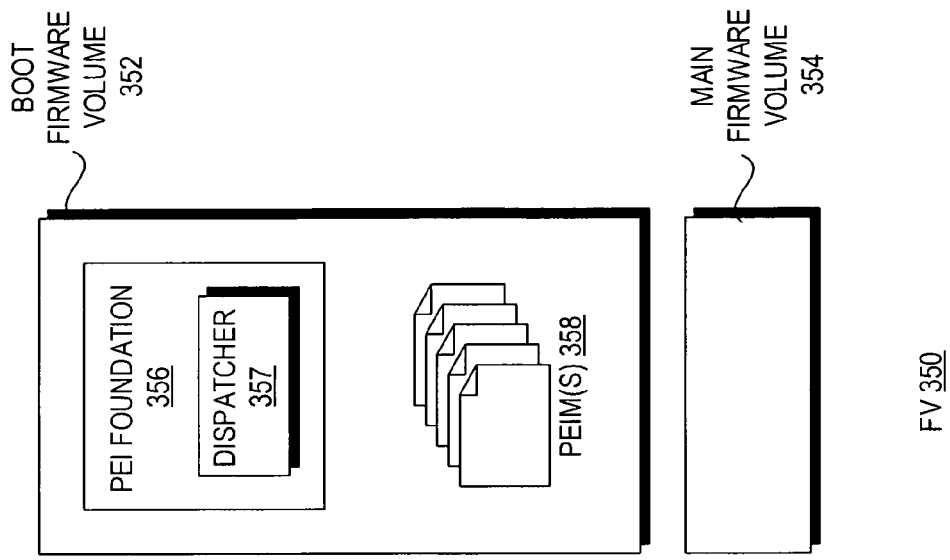
FIG. 3B is a block diagram illustrating a firmware volume in accordance with one embodiment of the present invention.
Figure 3A:
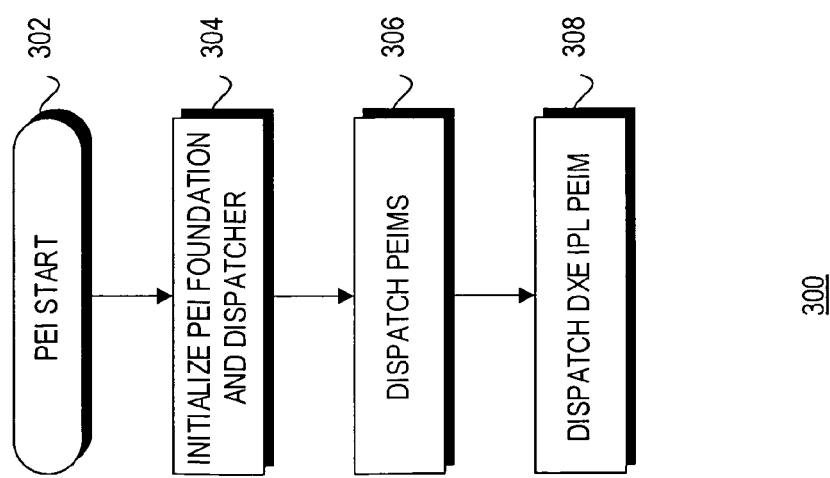
FIG. 3A is a flowchart illustrating the logic and operations of a Pre-EFI Initialization (PEI) phase in accordance with one embodiment of the present invention.

Details of the PEI phase 204 according to an embodiment of the present invention will be discussed in conjunction with FIGS. 3A and 3B. In FIG. 3A, a flowchart 300 illustrating one embodiment of the logic and operations of the PEI phase of the Framework is shown.

Beginning in a block 302, the PEI phase is started. Code to support the PEI phase is stored in a Firmware Volume (FV) 350, as shown in FIG. 3B. FV 350 includes a Boot Firmware Volume (BFV) 352 and a Main Firmware Volume (MFV) 354. BFV 352 includes code that appears in the memory address space of the system without prior firmware intervention. Main Firmware Volume 354 includes various firmware modules, drivers, and data. In other embodiments, the computer system may include one or more firmware volumes. In one embodiment, FV 350 is stored in non-volatile storage device 114 as part of system firmware 116.

At the beginning of PEI, the system memory is not yet initialized. The BFV 352 is loaded into a temporary memory for execution. Once system memory is initialized during PEI, then the firmware process are loaded into system memory for execution.

The PEI logic may also ascertain the boot mode of the computer system. Embodiments of a boot mode include a normal preboot, awakening from a sleep state, such as an S3 state, in accordance with Advanced Configuration and Power Interface (ACPI) specification (see, *Advanced Configuration and Power Interface Specification,* revision 2.0b, Oct. 11, 2002), and Recovery mode for reconstituting corrupted firmware.

It will be understood that embodiments of the invention may be used during an S3 resume boot mode. In resuming from an S3 state, the PEIM that would normally start the DXE Initial Program Loader (IPL) instead uses a Hardware Save Table to restore hardware back to a boot configuration. After restoring the hardware, the PEIM passes control to the OS-supplied resume vector. Embodiments of the invention allow the system to remain in a 64-bit mode when resuming from an S3 state instead of having to perform a 32-bit to 64-bit transition when resuming from S3.

In one embodiment, most of the PEI code is written in a high-level language, such as C. The remaining portion of PEI code may be written in Assembly. Embodiments herein allow for 64-bit addressing by the C code. In an embodiment, a single binary of PEI code is used for each processor of a system (discussed further below in conjunction with FIG. 5).

Continuing in flowchart 300, the PEI Foundation and PEI Foundation Dispatcher are initialized, as depicted in a block 304. Referring to FIG. 3B, the PEI Foundation 356 provides for the dispatching of PEIMs (Pre-EFI Initialization Modules) 358 using Dispatcher 357. Dispatcher 357 may also provide a set of PEIM services for use by the PEIMs 358. A PEIM may also be referred to as a firmware module.

Proceeding to a block 306, Dispatcher 357 dispatches PEIMs 358. In one embodiment, Dispatcher 357 examines the dependency expression of each PEIM to determine if the PEIM can execute. If the dependency expression of a PEIM cannot be satisfied, then execution of the PEIM will be deferred until later.

A PEIM may also provide a PEIM-to-PEIM Interface (PPI) that allows other PEIMs to communicate with the PEIM or the hardware the PEIM abstracts. When a PEIM executes, the PPIs of the PEIM are registered with the PEI Foundation 356 that manages a database of PPIs. When a PEIM wishes to use a specific PPI, the PEIM asks the PEI Foundation 356 for the location of the PPI. It will be understood that a PEIM may not necessarily generate a PPI.

Returning to FIG. 3A, after the PEI Foundation 356 confirms that Dispatcher 357 has launched all of the PEIMs, the logic then proceeds to a block 308 to dispatch the DXE phase Initial Program Loader (IPL) to begin the DXE phase of preboot.

Figure 4:
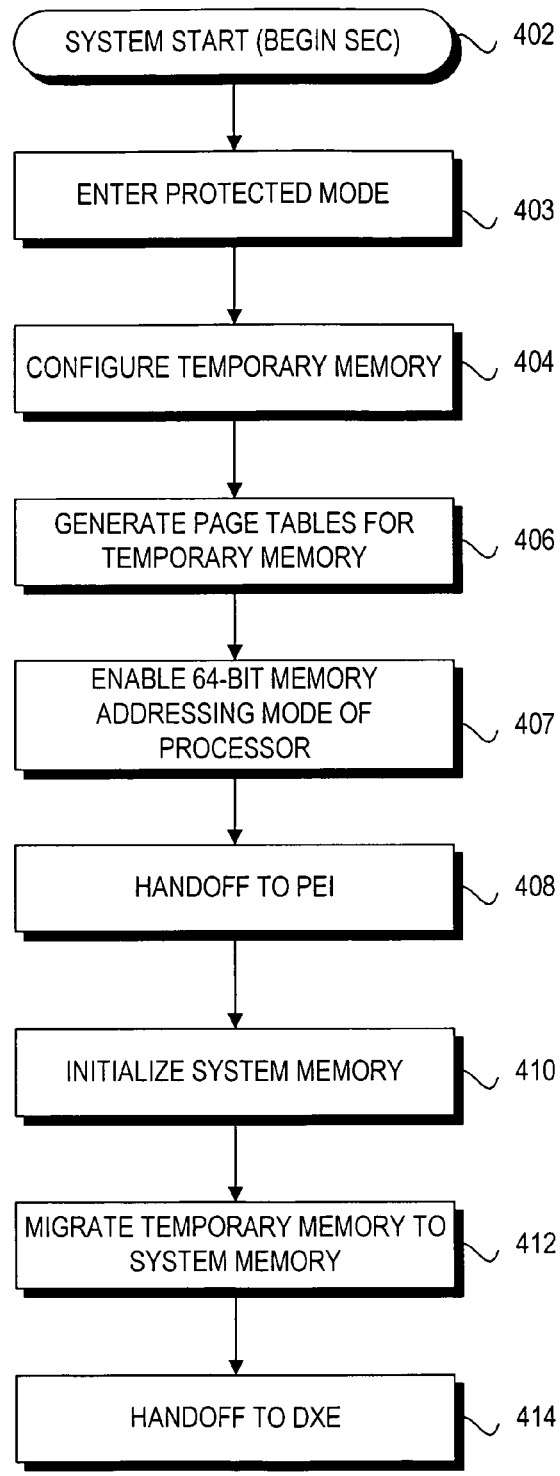
FIG. 4 is a flowchart illustrating the logic and operations of using preboot memory in accordance with one embodiment of the present invention.

Turning to FIG. 4, a flowchart 400 of using preboot memory in accordance with an embodiment of the invention is shown. In one embodiment, system firmware 116 performs the logic of flowchart 400. Beginning in a block 402, the system is started or reset. The processor references a reset vector that points to the boot code in non-volatile storage. In one embodiment, the SEC code is the first code executed after power-on. The SEC code may have prior knowledge of the location of the BFV so the SEC code may authenticate the PEI Foundation.

In a multiprocessor system, one processor is pre-designated as the initial boot processor. After the other processors are discovered, each processor will execute its own PEI sequence (discussed further below in conjunction with FIG. 5).

During startup, an IA-32 processor begins in real mode. Real mode provides for memory addressing up to 1 MB of virtual memory. In a block 403, the processor enters protected mode. Protected mode enables an IA-32 processor to address memory up to 4 Gigabytes.

Continuing to a block 404, temporary memory is configured. The temporary memory may be used until the system memory is initialized. In one embodiment, a processor cache, such as cache 101A, is configured for use as temporary memory. This may also be referred to as Cache-As-Random Access Memory (RAM) or "Fake RAM."

In an embodiment on an Intel® processor, the processor cache may be placed in a No-Evection Mode (NEM) to provide a Cache-As-RAM. An IA-32 processor cache may have a 4-way set associative. One fourth of the cache may be set aside for use as a Cache-As-RAM. For example, if the processor has a 512 Kilobyte (KB) cache, 128 KB may be used for a Cache-As-RAM. An embodiment of a processor cache includes an L2 cache.

In another embodiment, non-volatile storage may be configured as temporary memory. The SEC code may be pre-designed to generate a page directory and page tables in a non-volatile storage, such as Flash memory. In one embodiment using non-volatile storage, the processor may be put in a mode where the processor does not refer to an access bit field of the page tables. Page tables may include an access bit for each page that indicates if the page has been accessed. However, if the page table is kept in non-volatile storage, it may not be practical to set the access bit after a page has been accessed. In such a scenario, the processor may get hung if the processor tries to set an access bit in non-volatile storage. To eliminate this problem, in one embodiment, the access bit may not be referenced when using non-volatile storage for temporary memory.

Continuing to a block 406, page tables are generated for the temporary memory. In one embodiment, the page tables are generated from Memory Type Range Registers (MTRRs) (discussed below in conjunction with FIGS. 6 and 7).

In another embodiment, page tables are generated using pre-defined data structures from the firmware code. For example, the SEC code may be designed to setup temporary memory to start mapping at the 3 Gigabyte memory address.

After block 406, the logic proceeds to a block 407 to enable a 64-bit memory addressing mode of the processor. In one embodiment, the processor enters an EM64T mode. To enable EM64T, memory paging is to be enabled. Thus, page tables are setup in temporary memory to satisfy this EM64T requirement. In an IA-32 embodiment, the Control Register 3 (CR3) is set to point to the page directory in the temporary memory. In one embodiment, EM64T requires Physical Address Extensions (PAE) enabled.

Continuing to a block 408, preboot execution is handed-off to the PEI phase. In one embodiment, the SEC code passes the address of the BFV and the size of the temporary memory to the PEI phase.

When the PEI phase begins execution, the PEI code may execute using the temporary memory because the system memory has not yet been initialized. During PEI, at least one PEIM initializes system memory, as shown by a block 410.

After block 410, the logic proceeds to a block 412 to migrate the contents of the temporary memory to the system memory. This migration may include generating page tables for the system memory based at least in part on the pages tables of the temporary memory. PEI code may then continue to execute using the system memory.

Continuing to a block 414, the PEI phase hands-off preboot execution to the DXE phase. The PEI phase uses HOBs to pass state information to the DXE phase. The HOBs may be arranged in memory in a HOB List. The HOB List may include a Phase Handoff Information Table that describes the physical memory used by the PEI phase and the boot mode discovered during the PEI phase.

It will be appreciated that embodiments of the invention provide for 64-bit memory addressing from the earliest stages of a system boot. Also, memory paging prior to system memory initialization provides for a heap and stack for executing high-level languages, such as C, for early boot firmware instead of being restricted to a "stackless" low-level language, such as Assembly.

Figure 5:
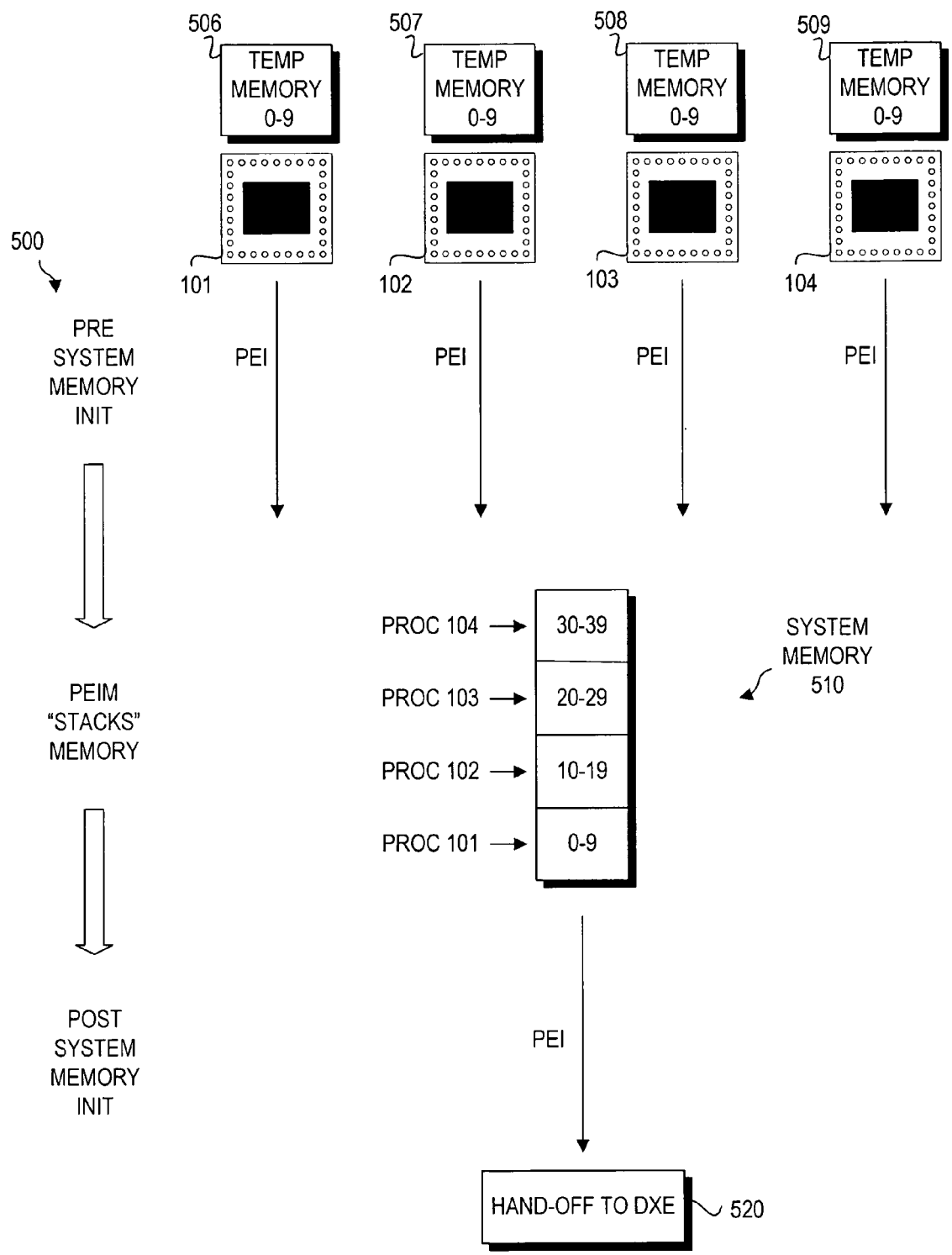
FIG. 5 is a block diagram illustrating preboot memory in a multi-processor system in accordance with one embodiment of the present invention.

Turning to FIG. 5, an embodiment of a PEI phase 500 in a multi-processor system is shown. It will be appreciated that the embodiment of FIG. 5 may be implemented in a multi-core system wherein each processor 101-104 represents a different core.

The PEI phase 500 begins before system memory has been initialized. Each processor 101-104 has its associated temporary memory 506-509, respectively. For the sake of clarity, in FIG. 5, each temporary memory uses virtual memory addresses 0-9. Before system memory is initialized, each processor executes its own PEI code and uses its own temporary memory. It will be appreciated that each processor may use overlapping memory mapping as this overlap will be reconciled when the contents are moved into system memory.

Once system memory 510 is initialized, a PEIM may "stack" the contents of temporary memory 506-509. As shown in FIG. 5, the memory addressing of the temporary memory is re-organized for storage in system memory 510. Page tables from temporary memory 506-509 are used in constructing page tables for system memory 510. In one embodiment, the temporary memory page tables may include a processor identification field to indicate which page is associated with which processor when stacking the contents of memory.

Once the temporary memory 506-509 has been reconciled in system memory 510, the execution of the PEI phase continues as a single process. Once PEI is completed, execution is handed-off to the DXE phase, as shown at 520.

Figure 6:
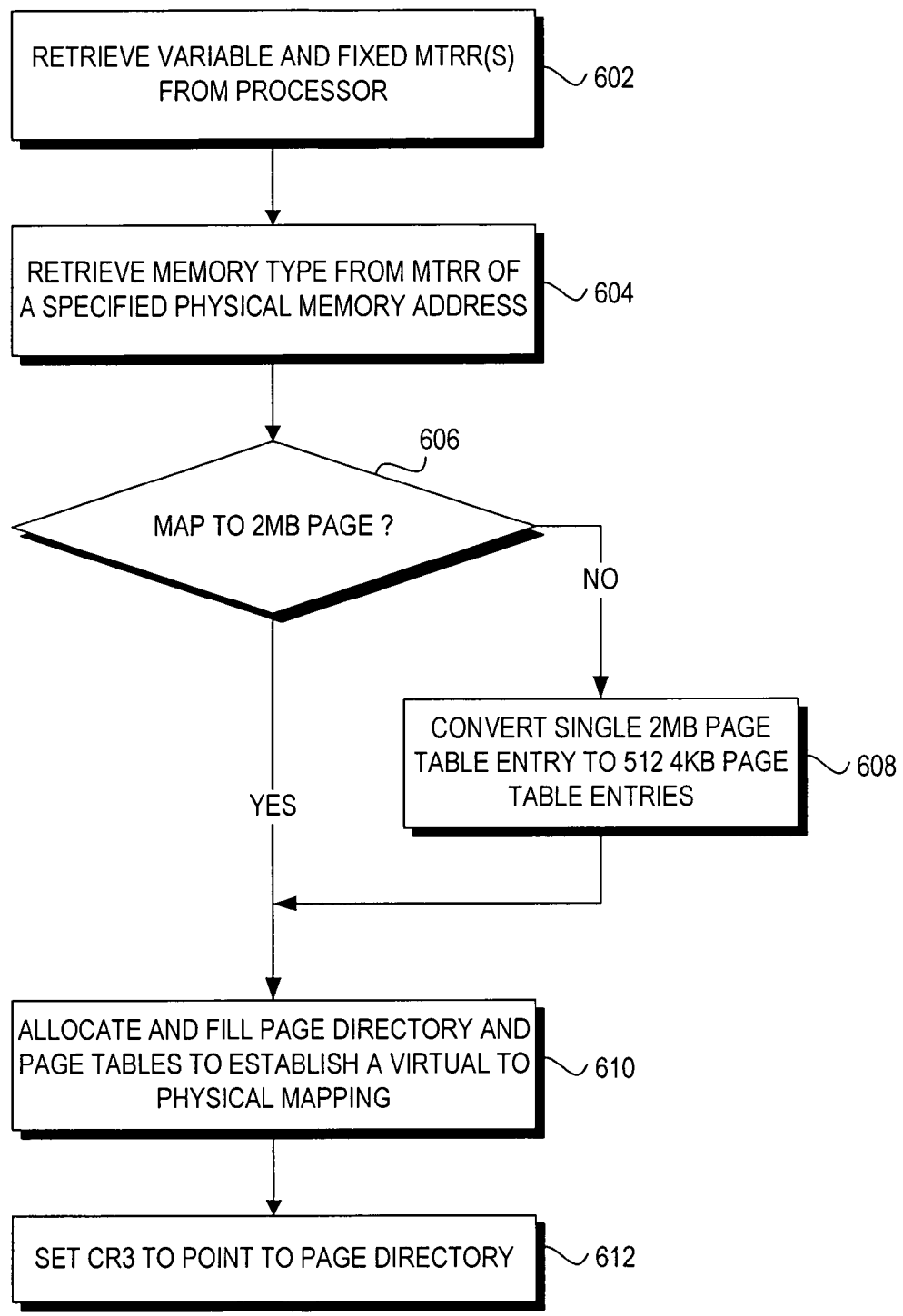
FIG. 6 is a flowchart illustrating the logic and operations of using preboot memory in accordance with one embodiment of the present invention.

Turning to FIG. 6, a flowchart 600 shows the logic and operations to configure page tables in temporary memory according to an embodiment of the invention. Referring to FIG. 7, the temporary memory is formed in a cache 704. Page directory 708 and page tables 710 in the temporary memory are constructed based at least in part on Memory Type Range Registers (MTRRs) 714. In one embodiment, the logic and operations of flowchart 600 is conducted by 32-bit code of system firmware 116. In another embodiment, the source code is written in a high-level language, such as C.

Starting in a block 602, variable and fixed MTRRs 714 are retrieved from processor 702. In one embodiment, processor 702 includes an Intel® P6 family processor having MTRRs. MTRRs 714 describe memory types of the system memory as relating to the method of caching, such as strong uncacheable, uncacheable, write combining, write through, write back, and write protected.

The MTRRs are used to determine the cachability of physical memory regions. In one embodiment, the MTRRs may define up to 96 memory address regions of physical memory. Some MTRRs described "fixed" memory ranges and memory types, while other MTRRs may be considered "variable" because software may set the memory type for a corresponding variable memory range.

Continuing to a block 604, the memory type of an MTRR corresponding to a specified physical memory address is retrieved.

Proceeding to a decision block 606, the logic determines if a 2 Megabyte (MB) address range from the specified address retrieved in block 604 may be mapped to a 2 MB page. The logic determines if the 2 MB address range has all the same memory types as described in the MTRRs. In one embodiment, a strategy is to map everything in the processor address space using 2 MB pages. If more granularity is needed, then 2 MB pages may be converted into multiple 4 KB pages.

The MTRRs are used to set up page tables in temporary memory so that more than one memory type is not mapped to a single page. This makes the migration to the page tables of system memory easier.

If the answer to decision block 606 is yes, then the address range may be mapped to a 2 MB page. The memory type for the 2 MB page may be gathered from the MTRRs. The logic then continues to a block 610 (described below). If the answer to decision block 606 is no, then the logic proceeds to a block 608 where the address range is split into multiple 4 KB page table entries. In one embodiment, the single 2 MB address range (i.e., page) is converted into 512 4 KB page table entries. The memory types for the 4 KB pages are read from the MTRR registers. The logic then continues to block 610.

In block 610, the logic allocates and fills in the page directory and page table entries to establish a virtual to physical mapping for memory from 0 to 4 GBs or higher. In one embodiment, the mapping is a 1:1 virtual to physical mapping.

Information stored in cache 704 is put into pages 712 that are referenced by page directory (DIR) 708 and page tables 710. This early paging allows a stack to be utilized prior to initialization of system memory. The logic then continues to a block 612 to set CR3 706 to point to the page directory in temporary memory.

Referring to FIG. 7, once system memory 732 is initialized, the contents of the temporary memory in cache 704 may be migrated to system memory 732. Page directory 734, pages tables 736, and pages 738 are generated based at least in part on page directory 708, page tables 710, and pages 712 from cache 704. Also, CR3 706 may be set to point to page directory 734.

Embodiments of the invention provide for 64-bit memory addressing prior to system memory initialization. Temporary memory having paging is created to support the 64-bit memory addressing. Thus, firmware executing prior to system memory initialization may have full 64-bit machine access. This enables more programming freedom for early preboot execution. Also, a stack and heap may be made available for executing high-level code, such as C, from the earliest stages of a system boot.

Embodiments of the invention use a 32-bit processor having a mode enabling 64-bit memory addressing. Thus, the firmware, such as EFI firmware, may be 32-bit code that allows for 64-bit memory addressing. Also, 32-bit firmware code executing on an IA-32 bit processor with 64-bit memory addressing enables the system to run a 32-bit and/or a 64-bit operating system.

Further embodiments of computer system 100 in FIG. 1 will now be discussed. Processors 101-104 may include, but are not limited to, an Intel® Corporation Pentium®, or Xeon®) family processor, or the like. Memory 105-108 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 105-108 may include one or more memory units that do not have to be refreshed.

Computer system 100 may include a memory controller, such as a Memory Controller Hub (MCH), an input/output controller, such as an Input/Output Controller Hub (ICH). In one embodiment, one or more memory controllers for memory 105-108 may reside in the same chip(s) as processors 101-104. Computer system 100 may also include system clock support, power management support, audio support, graphics support, or the like. Computer system 100 may include an I/O device such as a keyboard, a mouse, a display, a printer, a scanner, or the like.

Components of computer system 100 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like.

Computer system 100 may interface to external systems through network interface(s) 126. Network interface(s) 126 may include, but is not limited to, a modem, a Network Interface Card (NIC), or other interfaces for coupling a computer system to other computer systems. A carrier wave signal may be received/transmitted by network interface(s) 126. In one embodiment, the carrier wave signal may used to interface computer system 100 with network 128. Network 128 may include a Local Area Network (LAN), a Wide Area Network (WAN), the Internet, or any combination thereof. In one embodiment, network 128 is further coupled to another computer system (not shown) such that computer system 100 may communicate with this other computer system over network 128.

Computer system 100 also includes non-volatile storage 114 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

Storage 118 includes, but is not limited to, a magnetic disk drive, a magnetic tape drive, an optical disk drive, or the like. It is appreciated that instructions executable by processors 101-104 may reside in storage 118, memory 105-108, non-volatile storage 114, or may be transmitted or received via network interface(s) 126.

Embodiments of OS 120 include the Microsoft Windows® family of operating systems. Other operating systems that may also be used with computer system 100 include, but are not limited to, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   configuring a temporary memory of a computer system during a boot mode;
   establishing memory paging in the temporary memory prior to initializing a system memory of the computer system;
   enabling a 64-bit memory addressing mode of a processor of the computer system prior to initializing the system memory of the computer system;
   initializing the system memory of the computer system; and
   migrating contents of the temporary memory to the system memory,
   wherein establishing memory paging includes generating page tables for the temporary memory by referring to information maintained in registers of the processor of the computer system.

2. The method of claim 1 wherein migrating contents of the temporary memory to the system memory includes:
   generating page tables for the system memory based at least in part on the pages tables for the temporary memory.

3. The method of claim 1 wherein configuring the temporary memory includes:
   configuring a first temporary memory associated with a first processor of the computer system; and
   configuring a second temporary memory associated with a second processor of the computer system.

4. The method of claim 3 wherein migrating contents of the temporary memory includes stacking contents from the first temporary memory and contents from the second temporary memory into the system memory.

5. The method of claim 1 wherein the temporary memory includes one of a cache of a processor of the computer system or a non-volatile storage unit of the computer system.

6. The method of claim 1, further comprising maintaining a stack in the temporary memory.

7. The method of claim 6 wherein the stack may utilize the full memory addressing space of the computer system.

8. The method of claim 1 wherein establishing memory paging includes generating page tables for the temporary memory by referring to a data structure that defines page tables for the temporary memory.

9. The method of claim 1 wherein the boot mode includes a preboot phase of the computer system.

10. The method of claim 1 wherein the boot mode includes a resume from a sleep state, wherein the sleep state is substantially in compliance with an Advanced Configuration and Power Interface specification.

11. An article of manufacture, comprising:
a machine-accessible medium including a plurality of instructions which when executed perform operations comprising:
configuring a cache-as-Random Access Memory (RAM) of a processor during a preboot phase of a computer system;
generating page tables for the cache-as-RAM prior to initializing a system memory of the computer system, wherein the page tables are stored in the cache-as-RAM;
enabling a 64-bit memory addressing mode of the processor prior to initializing the system memory of the computer system;
initializing the system memory of the computer system; and migrating contents of the cache-as-RAM to the system memory,
wherein generating page tables for the cache-as-RAM includes setting a control register of the processor to point to a page directory in a temporary memory.

12. The article of manufacture of claim 11 wherein generating page tables for the cache-as-RAM includes retrieving memory type information from Memory Type Range Registers of the processor, wherein a Memory Type Range Register describes a memory type of an address range of system memory.

13. The article of manufacture of claim 12 wherein generating page tables for the cache-as-RAM includes:
mapping the address range to a page table entry in the cache-as-RAM.

14. The article of manufacture of claim 12 wherein generating page tables for the cache-as-RAM includes:
converting the address range into multiple address ranges and mapping the multiple address ranges into corresponding multiple page table entries in the cache-as-RAM.

15. The article of manufacture of claim 11 wherein the cache-as-RAM is 64-bit memory addressable.

16. A computer system, comprising:
a processor;
an Synchronized Dynamic Random Access Memory (SDRAM) unit coupled to the processor; and
a storage unit coupled to the processor, wherein the storage unit including a plurality of instructions which when executed by the processor perform operations comprising:
configuring a cache-as-Random Access Memory (RAM) of the processor during a preboot phase of the computer system;
generating page tables for the cache-as-RAM prior to initializing the SDRAM unit, wherein the page tables are stored in the cache-as-RAM;
enabling a 64-bit memory addressing mode of the processor prior to initializing the SDRAM unit;
initializing the SDRAM unit; and
migrating contents of the cache-as-RAM to the SDRAM unit,
wherein generating page tables for the cache-as-RAM includes retrieving memory type information from Memory Type Range Registers of the processor, wherein a Memory Type Range Register describes a memory type of an address range of the SDRAM unit.

17. The computer system of claim 16 wherein generating page tables for the cache-as-RAM further includes:
mapping the address range to a page table entry in the cache-as-RAM, if the address range is of the same memory type;
converting the address range into multiple address ranges and mapping the multiple address ranges into corresponding multiple page table entries in the cache-as-RAM, if the address range includes more than one memory type; and
setting a control register of the processor to point to a page directory in the cache-as-RAM.

18. The computer system of claim 16 wherein the processor includes a 32-bit processor having a 64-bit memory addressing mode.

* * * * *